United States Patent [19]
Gierer et al.

[11] Patent Number: 5,924,165
[45] Date of Patent: Jul. 20, 1999

[54] CASTER FOOT WITH ACCESSORY STORAGE

[75] Inventors: Joseph T. Gierer, Glen Carbon; John F. Moody, Bunker Hill, both of Ill.; Kiyoshi Hoshino, Chesterfield; Stuart V. Holsten, O'Fallon, both of Mo.

[73] Assignee: Emerson Electric Co., St. Louis, Mo.

[21] Appl. No.: 08/863,897

[22] Filed: May 27, 1997

[51] Int. Cl.⁶ ...................................................... A47L 9/00
[52] U.S. Cl. .......................... 15/323; 15/327.2; 16/18 CG; 16/31 R
[58] Field of Search ...................... 15/323, 327.2; 16/18 CG, 31 R

[56] References Cited

U.S. PATENT DOCUMENTS

| | | |
|---|---|---|
| 2,935,760 | 5/1960 | Martinec ..................................... 15/323 |
| 4,827,564 | 5/1989 | Brown . |
| 4,845,793 | 7/1989 | Meyer ......................................... 15/328 |
| 4,888,849 | 12/1989 | Hult et al .............................. 15/323 X |
| 5,313,686 | 5/1994 | Berfield ..................................... 15/323 |
| 5,373,606 | 12/1994 | Bosyj et al. .............................. 15/323 |
| 5,528,794 | 6/1996 | Tomasiak .................................. 15/323 |

*Primary Examiner*—Chris K. Moore
*Attorney, Agent, or Firm*—Arnold White & Durkee

[57] ABSTRACT

A caster foot assembly for use with an appliance such as a wet/dry vacuum is disclosed. The caster foot assembly comprises a body; at least one vacuum accessory securing post in the body; and a caster receptacle in the body, wherein the securing post and the caster receptacle vertically overlap within the body to lower the center of gravity of the appliance. Furthermore, a portion of the top surface of the securing post is angled to facilitate the securing of accessories to the caster foot assembly.

28 Claims, 5 Drawing Sheets

CASTER FOOT WITH ACCESSORY STORAGE

FIELD OF THE INVENTION

The present invention relates generally to appliances, and more particularly to an improved design for a caster foot assembly for an appliance.

BACKGROUND OF THE INVENTION

Conventional home appliances such as wet/dry vacuums have used a caster foot assembly such as those disclosed in U.S. Pat. No. 4,827,564, assigned to Emerson Electric Co., which is incorporated herein by reference in its entirety. As shown in FIGS. 1 and 2, such prior art caster foot assemblies 2 comprised a body 4, a caster 6 (comprised of a wheel 8, caster fork 9, caster stem 10, and rivet 11) attached to the underside of the body, a raised ring 12 constructed on the upper surface of the body, and a drum mount 16 attached to the body and connectable to a vacuum drum (not shown). Typically, four caster foot assemblies would appear on the underside of the vacuum drum so that the wet/dry vacuum could be easily rolled about the floor. Moreover, this prior art design allowed various vacuum nozzles and other accessories accompanying the wet/dry vacuum to be fitted over raised ring 12 to store such nozzles when not in use.

While these conventional caster foot assemblies were advantageous in that nozzles and other accessories could be secured to the wet/dry vacuum when not in use, such designs were prone to tipping, in part because the center of gravity of the wet/dry vacuum was raised to accommodate both the raised ring 12 and the caster 6, as shown in cross-section in FIG. 2. Furthermore, it was relatively difficult to store the nozzles on the prior art raised ring design because the nozzles had to be slide-fitted at an angle almost exactly parallel with the side walls of the raised ring in order to fit the nozzle over the raised ring 12.

The present invention discloses a caster foot assembly which overcomes these problems encountered in the prior art.

SUMMARY OF THE INVENTION

A caster foot assembly for use with an appliance such as a wet/dry vacuum comprises a body; at least one vacuum accessory securing post in the body; and a caster receptacle in the body, wherein the securing post and the caster receptacle vertically overlap within the body to lower the center of gravity of the appliance. A portion of the top surface of the securing post is angled to facilitate the securing of accessories to the caster foot assembly.

BRIEF DESCRIPTION OF THE DRAWINGS

Other aspects and advantages of the present invention will become apparent upon reading the following detailed description and upon reference to the drawings in which.

DESCRIPTION OF ILLUSTRATIVE EMBODIMENTS

Figure 1:
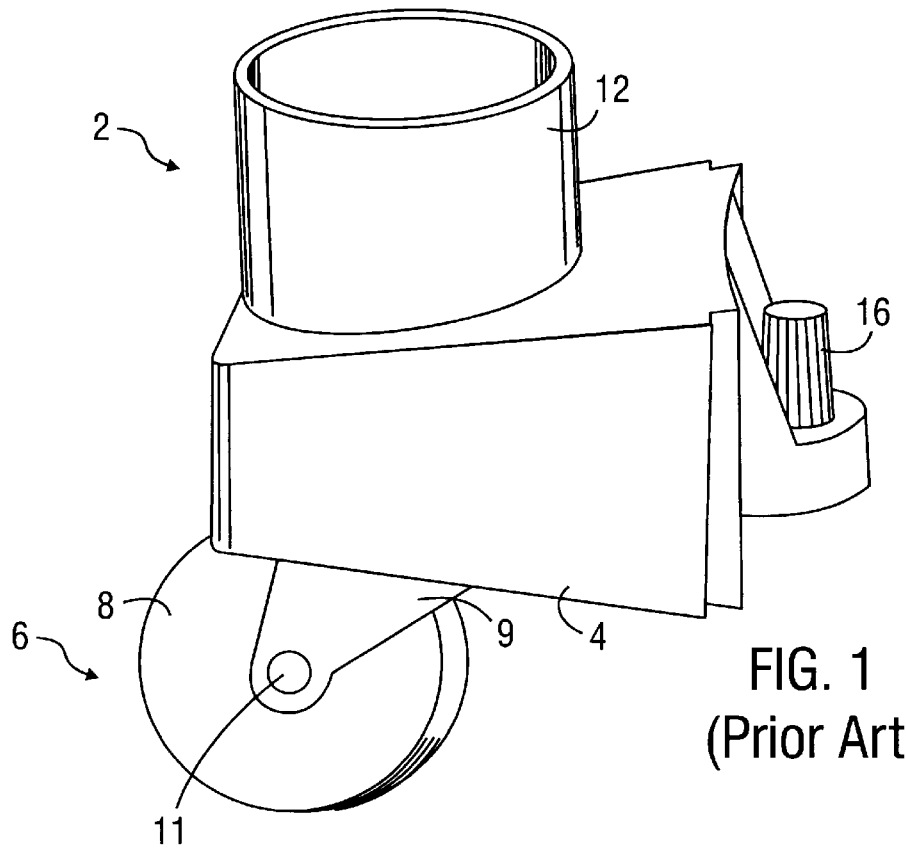
FIG. 1 shows an isometric view of a prior art caster foot assembly.
Figure 2:
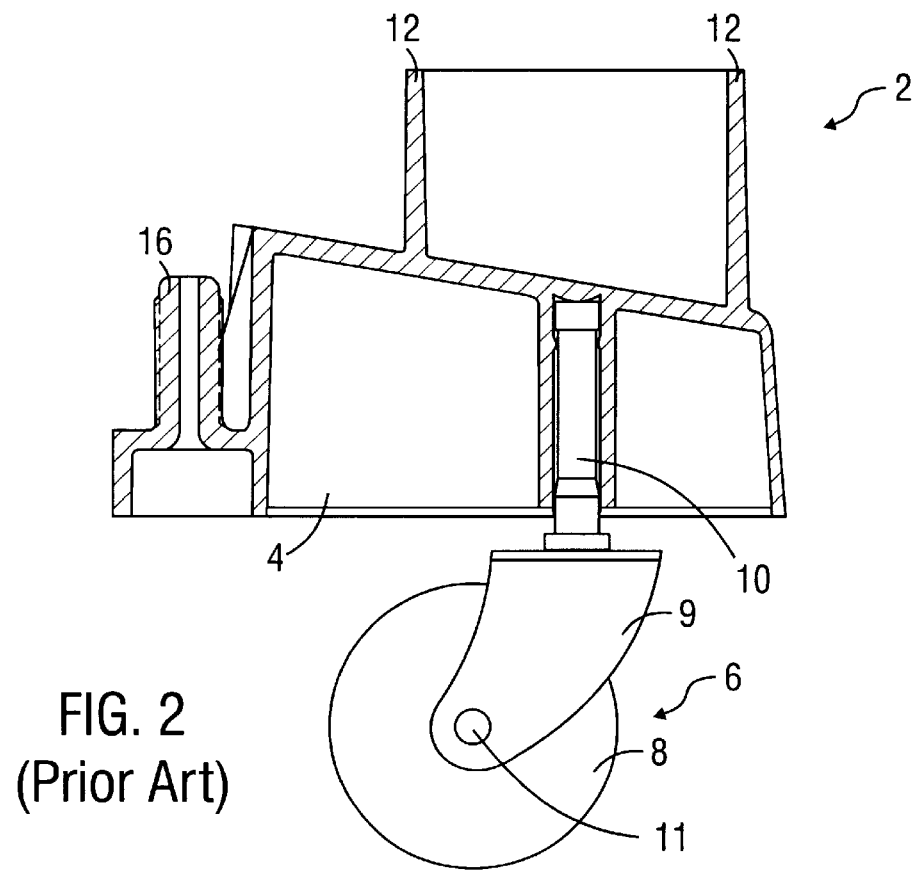
FIG. 2 shows a cross-sectional view of the prior art caster foot assembly of FIG. 1.
Figure 3:
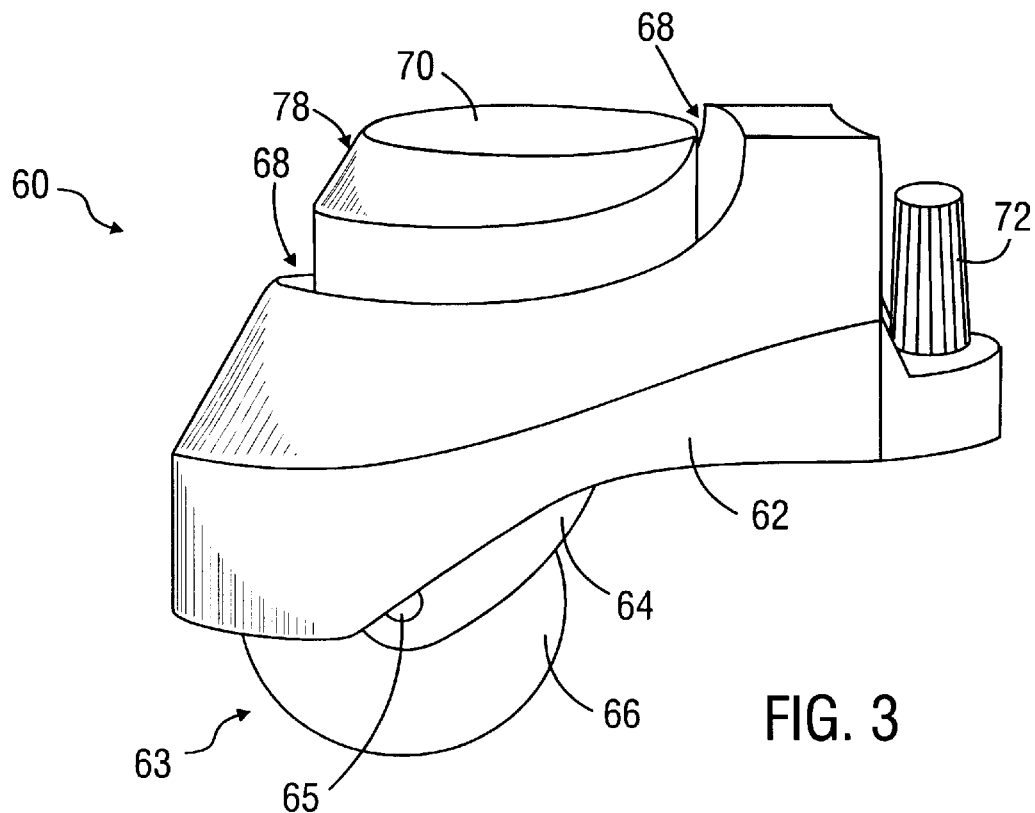
FIG. 3 shows an isometric view of the disclosed improved caster foot assembly.
Figure 4:
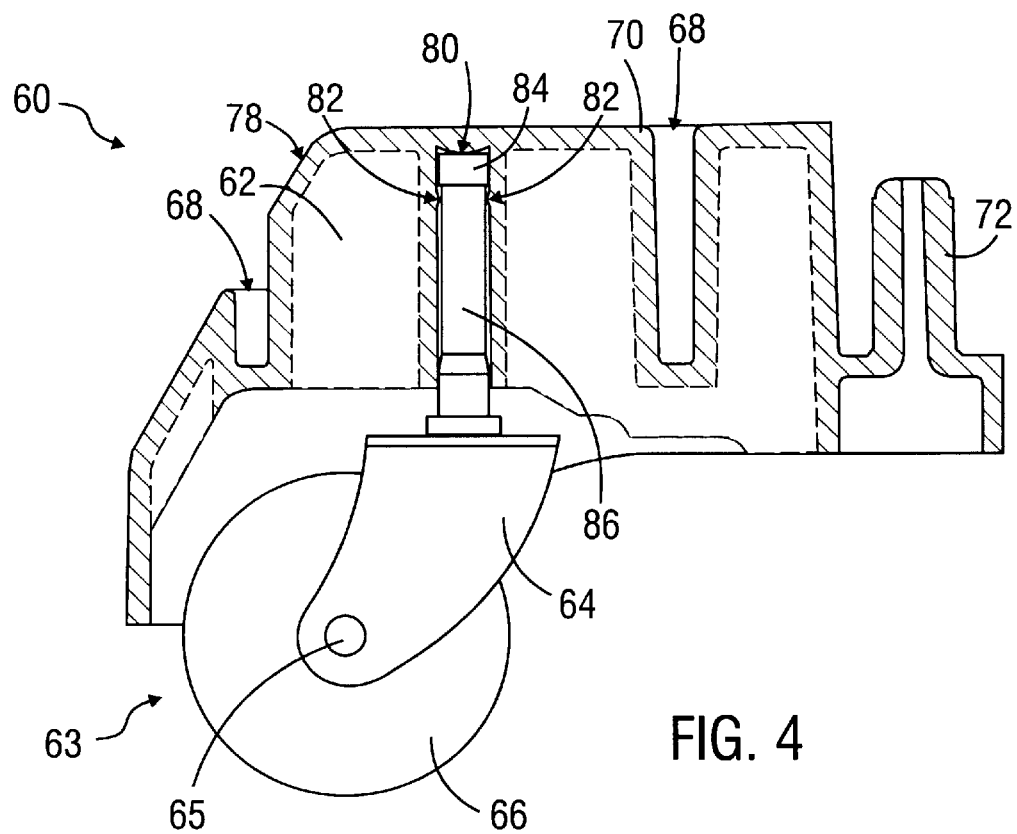
FIG. 4 shows a cross-sectional view of the disclosed improved caster foot assembly of FIG. 3.

FIGS. 3 and 4 show the disclosed improved caster foot assembly 60. Caster foot assembly 60 comprises a body 62, a caster receptacle 80, a caster 63 (comprised of a wheel 66, caster fork 64, caster stem 86, and rivet 65) attached within the caster receptacle 80, an entrenched ring 68 constructed within the body and defining a securing post 70, and a drum mount 72 attached to the body 62 and connectable to the vacuum drum 90 (see FIG. 7). Because the securing post 70 is built into the body 62 and vertically overlaps with the caster receptacle 80, the accessories to be press-fitted over the securing post 70 will rest closer to the ground. This is advantageous when compared with prior art designs because it lowers the center of gravity of the wet/dry vacuum to which accessories have been attached, thus reducing the risk of inadvertently tipping the vacuum.

Figure 5:
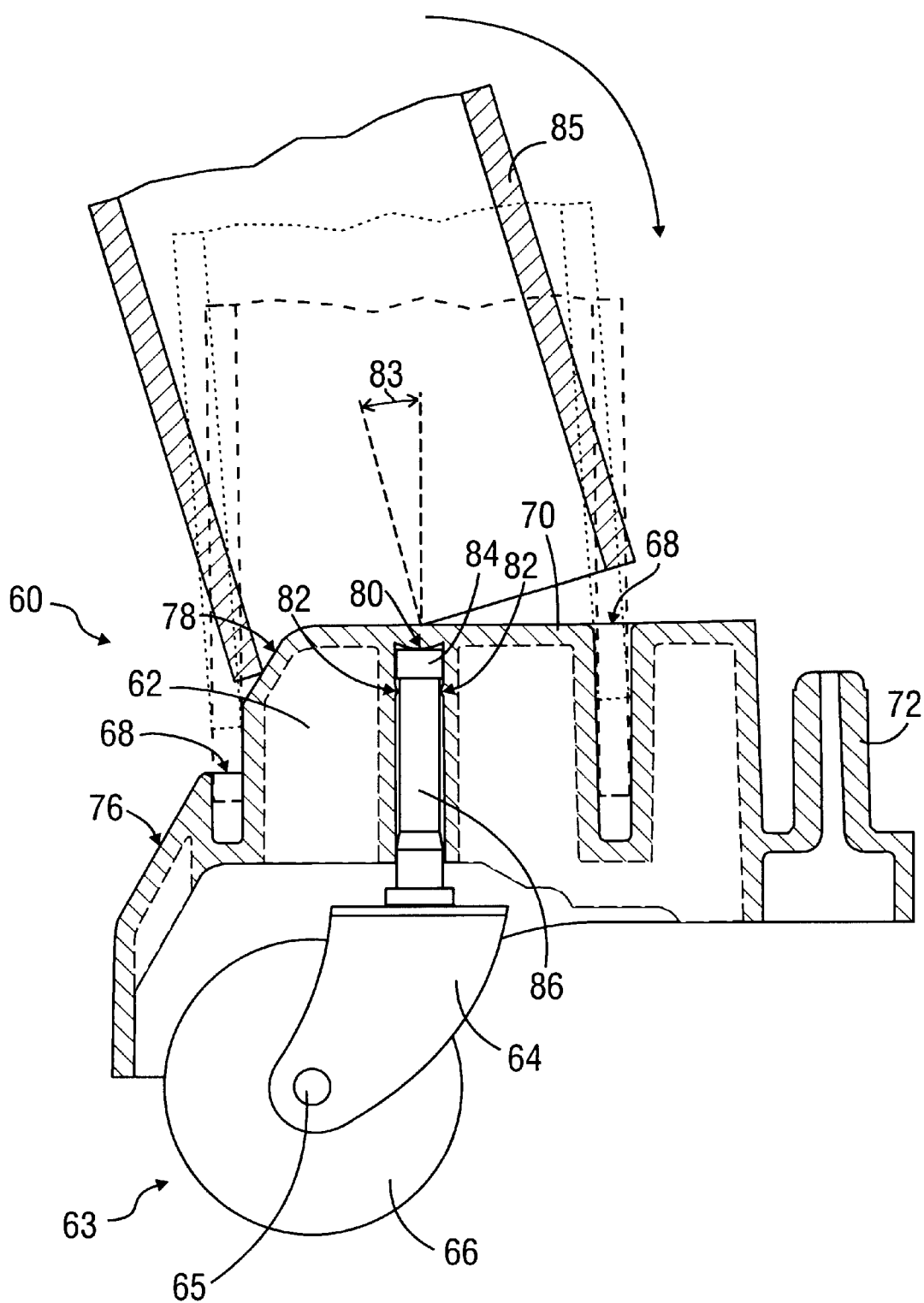
FIG. 5 shows the same cross-sectional view as FIG. 4 and illustrates how the disclosed improved caster foot design facilitates accessories attachment to the assembly.
Figure 6:
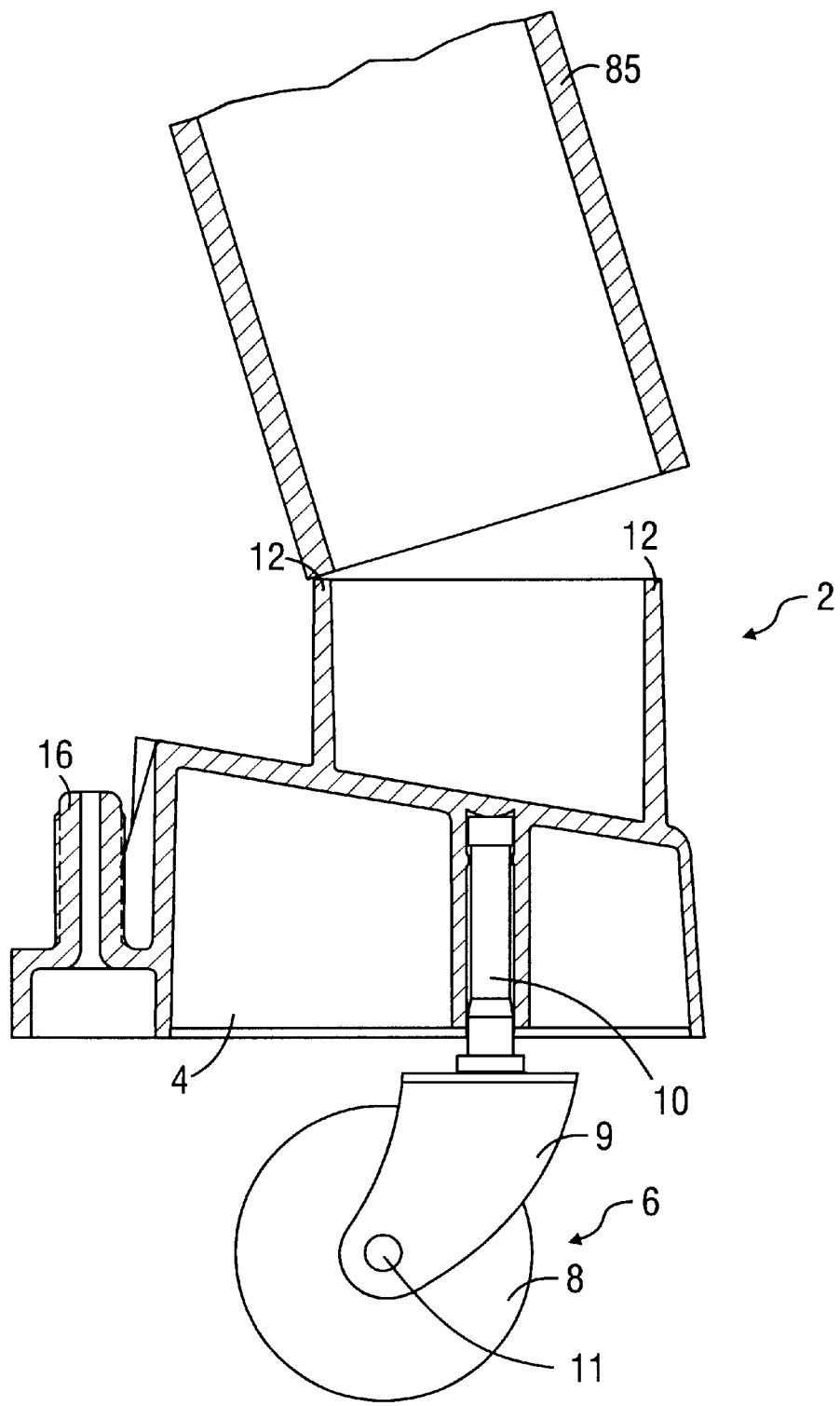
FIG. 6 shows the same cross-sectional view of the prior art caster foot assembly of FIG. 2 showing the relative difficulty of securing an attachment to the caster foot assembly.

Moreover, portions of the top surface of securing post 70 are angled in the disclosed improved caster foot assembly design to define edge 78. This is advantageous when compared with prior art designs because it is easier to secure the vacuum accessories to the securing post 70. Specifically, because of the angled edge 78, a tubular accessory 85, such as a wet/dry vacuum nozzle, can be easily placed over the securing post 70 with a greater angle of entry or "lead-in angle" when compared with the prior art designs. As shown in FIG. 5, a user wishing to attach an accessory 85 to the improved caster foot assembly 60 may direct the accessory 85 at a greater angle of entry 83 with respect to the substantially vertical side wall of the securing post 70. Per the disclosed design, the bottom ring of accessory 85 may touch the angled edge 78, and easily slide down into the entrenched ring 68 in order to secure the accessory 85 to securing post 70. By comparison, the prior art design, which did not have a top surface suitable for angling, required the user wishing to secure an accessory to direct the accessory 85 at a substantially zero-degree angle of entry, making it harder for the user to align the accessory with the substantially vertical side wall of the raised ring. Thus, as shown in FIG. 6, when a large angle of entry is used to try to secure an accessory to the raised ring 12 of the prior design, the accessory will not slide onto the ring with the same ease as per the disclosed inventive design.

The disclosed caster foot assembly 60 is preferably constructed as a single mold-injected plastic body into which the body 62, the entrenched ring 68, the drum mount 72, the caster receptacle 80, and a detent or retaining rib 82 are formed. A high density plastic, such as poly-propylene, is a suitable material. The caster 63 is readily purchasable as an assembly. A suitable caster 63 will include an enlarged nub 84 on the caster stem 86 which can be "snapped" across the retaining rib 82 and into the caster receptacle 80. Once attached, the greater diameter of nub 84 will ensure that the caster assembly will not slip back out of the caster receptacle 80, it being held by the smaller diameter ring formed by the retaining rib 82. Once attached, the caster stem 86 of caster 63 can turn relatively freely within the caster receptacle 80.

Figure 7:
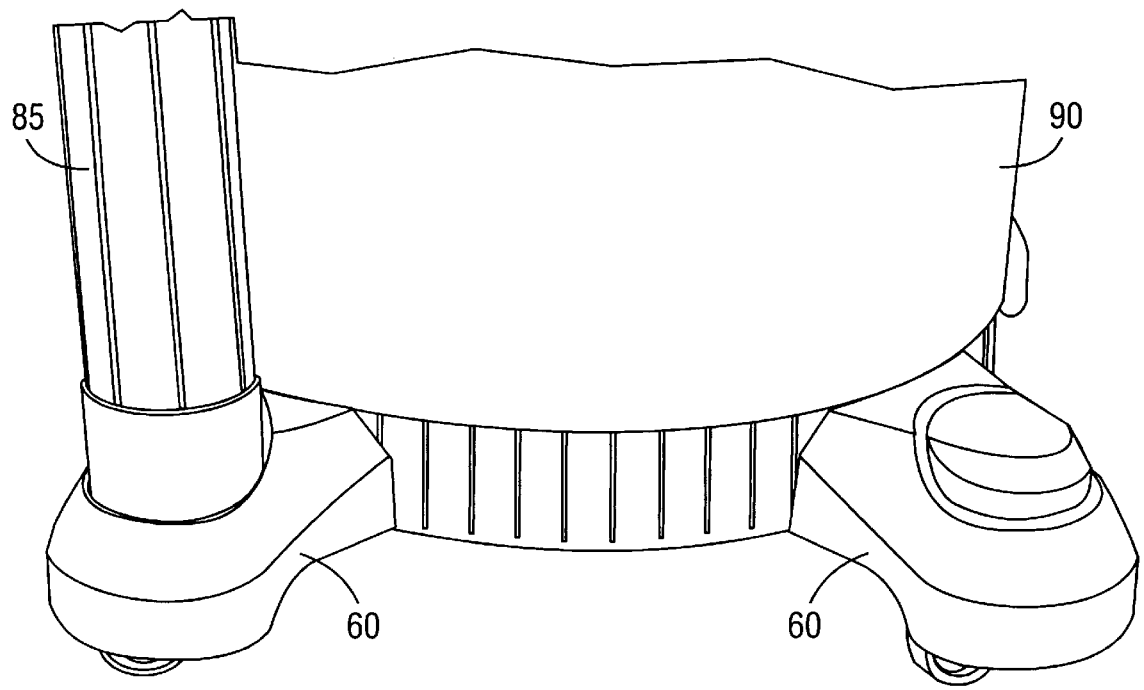
FIG. 7 shows a wet/dry vacuum drum with two of the disclosed improved caster foot assemblies attached to the vacuum drum, and an accessory secured to one of the caster foot assemblies.

FIG. 7 shows the disclosed caster foot assembly 60 attached to a wet/dry vacuum drum 90. Four caster foot assemblies usually appear at equal distances around the bottom edge of the wet/dry vacuum drum 90, although one of ordinary skill will realize that more or less assemblies could also be used. The caster foot assemblies 60 are connected to the vacuum drum 90 by press-fitting the drum mount 72 into an appropriately sized receptacle within the vacuum drum 90 (only a portion of which being shown in FIG. 7). FIG. 7 also show an accessory 85, such as a vacuum nozzle, which has been attached to the disclosed improved caster foot assembly.

The accessories 85 can be press-fitted onto the securing post 70 as shown in FIG. 5. This can be accomplished by shaping the accessories 85 and the securing post 70 appropriately so that the two can adequately mate. If a press-fitting arrangement is used, the bottom of the accessory will not touch the bottom of the entrenched ring 68 when an accessory 85 has been secured to securing post 70. A press-fitting arrangement is preferred in large part because an accessory 85 that has been press-fit onto a securing post 70 will not "wobble" and should be satisfactorily mounted. Of course, one of ordinary skill will realize that many other mounting arrangements are possible, including a slip-fitted arrangement where the bottom of the accessory 85 will touch the bottom of the entrenched ring 68.

Those skilled in the art who now have the benefit of the present disclosure will appreciate that the present invention may take many forms and embodiments and have many uses. For example, the present invention can be used in conjunction with appliances other than wet/dry vacuums and can be used to store or secure more than the accessories to be used with the appliance. Also, one of ordinary skill will realize that while the use of an entrenched ring 68 has been disclosed as a way of defining securing post 70, the securing post 70 can be defined in any number of ways consistent with the disclosed invention.

For example, the excess body material surrounding entrenched ring 68 is not necessary to define the securing post 70 and may be eliminated, although it is currently preferred for reasons of mechanical stability. Even when such excess material is eliminated, the inventive advantage of a lowered center of gravity facilitated by caster receptacle/securing post vertical overlap can still be realized.

The disclosed improved caster foot assembly may be modified to include more than one securing post for the attachment of multiple accessories to a single caster foot assembly.

Furthermore, while the side walls and the top surface of the securing post as disclosed form a roughly cylindrical shape, part of the top surface of the securing post may also be recessed such that the top surface of the securing post defines a ring structure similar to the prior art, although of sufficient thickness to be angled. In this embodiment, partially recessed top surface would define a second securing post within the first securing post 70, and the caster receptacle 80 would be contained within and would vertically overlap with the second securing post. Such a structure would have the advantage of providing two concentric securing posts which could accommodate accessories of different diameters, and both of which could be angled to provide easier accessory mounting.

Figure 8:
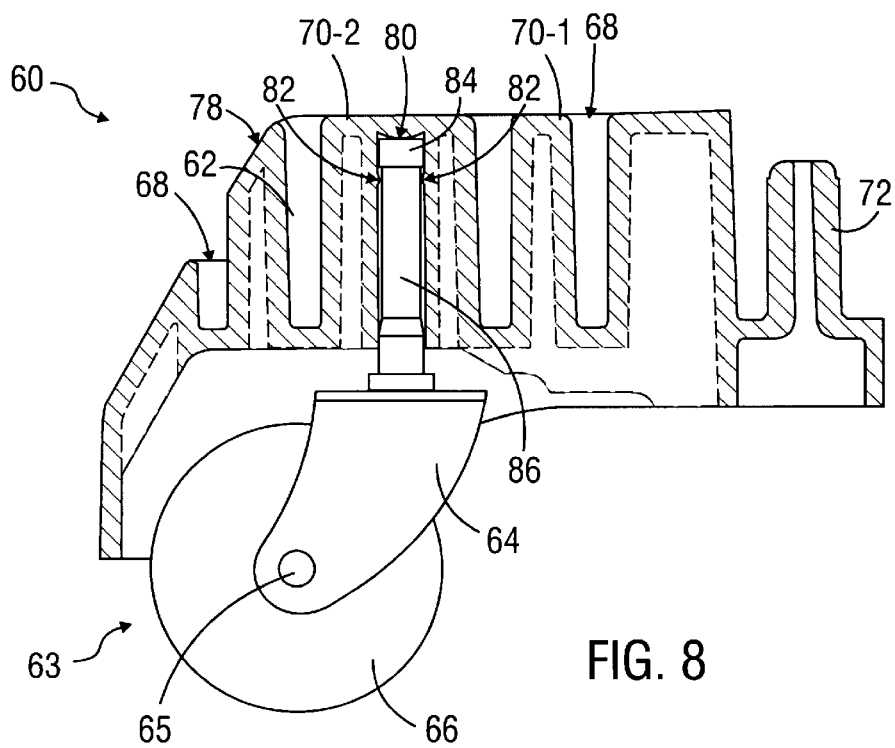
FIG. 8 shows a cross-sectional view of an improved caster foot assembly in accordance with another embodiment of the invention having two concentric securing posts.

This is shown in FIG. 8, wherein an outer securing post is designated with reference numeral 70-1 and a concentric inner securing post is designated with reference numeral 70-2.

Moreover, while it is presently preferred to design the improved caster foot assembly with the caster receptacle directly in the center of the securing post, as shown in FIG. 4, the advantages of lowered center of gravity facilitated by caster receptacle/securing post vertical overlap can be realized even when the caster receptacle is not centered with respect to the securing post, and even when the caster receptacle is formed outside the area defined by the securing post.

It is intended that the embodiments described herein should be illustrative only, and not limiting with respect to the scope of the present invention. Rather, it is intended that the invention encompass all modifications, equivalents and alternatives falling within the spirit and scope of the invention as defined by the appended claims.

What is claimed is:

1. A caster foot assembly for an appliance, the appliance having at least one accessory to be used in conjunction with the appliance, comprising:
   (a) a body;
   (b) at least one securing post in the body, the at least one securing post having side walls and a top surface, the at least one securing post used for securing at least one accessory to the caster foot assembly; and
   (c) a caster receptacle in the body, wherein the at least one securing post and the caster receptacle vertically overlap within the body to lower the center of gravity of the appliance,
   wherein at least a portion of the top surface of the securing post is angled to facilitate the securing of an accessory to the caster foot assembly.

2. The caster foot assembly of claim 1, further comprising a drum mount.

3. The caster foot assembly of claim 1, further comprising a caster attached within the caster receptacle.

4. The caster foot assembly of claim 1, wherein the caster receptacle and the securing post are centered with respect to one another.

5. The caster foot assembly of claim 1, wherein the securing post is defined by forming an entrenched ring within the body.

6. The caster foot assembly of claim 1, wherein there are two securing posts of different diameters which are concentric to one another.

7. An appliance, comprising:
   (a) a drum;
   (b) at least one caster foot assembly, wherein the caster foot assembly comprises;
      (i) a body;
      (ii) at least one securing post in the body, the at least one securing post having side walls and a top surface, the at least one securing most used for securing at least one accessory to the caster foot assembly; and
      (iii) a caster receptacle in the body, wherein the at least one securing post and the caster receptacle vertically overlay within the body to lower the center of gravity of the appliance
   wherein at least a portion of the top surface of the securing post is angled to facilitate the securing of an accessory to the caster foot assembly.

8. The appliance of claim 7, wherein the caster foot assembly further comprises a drum mount, and wherein the drum mount is used to attach the caster foot assembly to the drum.

9. The appliance of claim 7, further comprising a caster attached within the caster receptacle.

10. The appliance of claim 7, wherein the caster receptacle and the securing post are centered with respect to one another.

11. The appliance of claim 7, wherein the securing post is defined by forming an entrenched ring within the body.

12. The appliance of claim 7, wherein the appliance is a wet/dry vacuum.

13. The appliance of claim 7, wherein there are two securing posts of different diameters which are concentric to one another.

14. A caster foot assembly for an appliance, the appliance having at least one accessory to be used in conjunction with the appliance, comprising:

(a) a body; and
   (b) at least one securing post in the body, the at least one securing post having side walls and a top surface, the at least one securing post used for securing at least one accessory to the caster foot assembly;
   wherein at least a portion of the top surface of the at least one securing post is angled to facilitate the securing of an accessory to the caster foot assembly.

15. The caster foot assembly of claim 14, further comprising a drum mount.

16. The caster foot assembly of claim 14, further comprising a caster receptacle for attaching a caster to the body.

17. The caster foot assembly of claim 16, wherein the caster receptacle and the at least one securing post vertically overlap within the body.

18. The caster foot assembly of claim 16, wherein the caster receptacle and the securing post are centered with respect to one another.

19. The caster foot assembly of claim 14, wherein the securing post is defined by forming an entrenched ring within the body.

20. The caster foot assembly of claim 14, wherein there are two securing posts of different diameters which are concentric to one another.

21. An appliance, comprising:

(a) a drum;
   (b) at least one caster foot assembly, wherein the caster foot assembly comprises:
      (i) a body; and
      (ii) at least one securing post in the body, the at least one securing post having side walls and a top surface, the securing post used for securing at least one accessory to the caster foot assembly;
   wherein at least a portion of the top surface of the securing post is angled to facilitate the securing of accessories to the caster foot assembly.

22. The appliance of claim 21, wherein the caster foot assembly further comprises a drum mount, and wherein the drum mount is used to attach the caster foot assembly to the drum.

23. The appliance of claim 21, further comprising a caster receptacle for attaching a caster to the body.

24. The appliance of claim 23, wherein the caster receptacle and the at least one securing post vertically overlap within the body.

25. The appliance of claim 23, wherein the caster receptacle and the securing post are centered with respect to one another.

26. The appliance of claim 21 wherein the securing post is defined by forming an entrenched ring within the body.

27. The appliance of claim 21, wherein the appliance is a wet/dry vacuum.

28. The appliance of claim 21, wherein there are two securing posts of different diameters which are concentric to one another.

* * * * *